Dec. 2, 1969  W. A. FARRAND ETAL  3,482,232
TRANSDUCER POSITIONING MEMBER HAVING HYDROSTATIC
BEARING SUPPORTS
Filed Jan. 5, 1967  3 Sheets-Sheet 1

INVENTORS
WILLIAM A. FARRAND
ROBERT B. HORSFALL
WARNER D. WILLIAMS
NORMAN E. MARCUM

BY Robert G Rogers
ATTORNEY

Dec. 2, 1969  W. A. FARRAND ET AL  3,482,232
TRANSDUCER POSITIONING MEMBER HAVING HYDROSTATIC
BEARING SUPPORTS
Filed Jan. 5, 1967  3 Sheets-Sheet 2
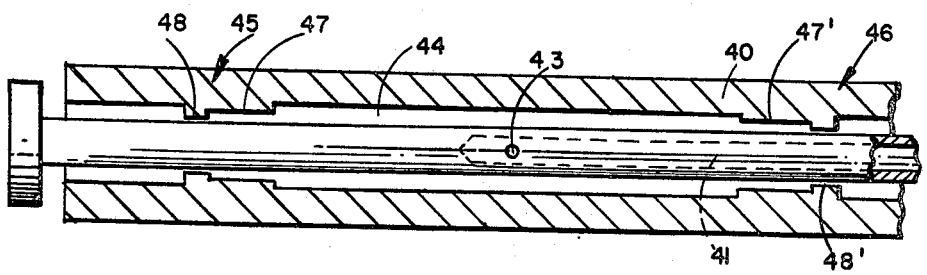
FIG.3
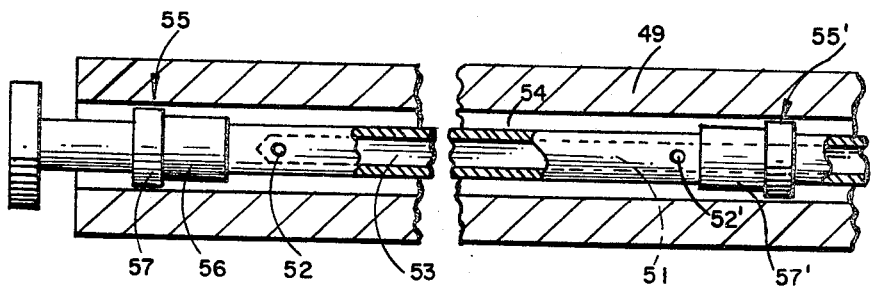
FIG.4
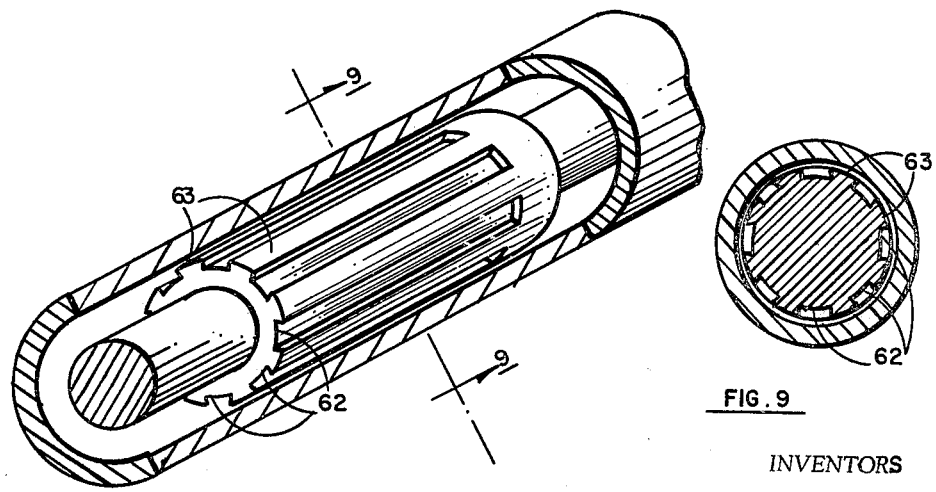
FIG. 8
FIG. 9
INVENTORS
WILLIAM A. FARRAND
BY ROBERT B. HORSFALL
WARNER D. WILLIAMS
NORMAN E. MARCUM
Robert G. Rogers
ATTORNEY INVENTORS
WILLIAM A. FARRAND
ROBERT B. HORSFALL
BY WARNER D. WILLIAMS
NORMAN E. MARCUM Robert G Rogers
ATTORNEY

United States Patent Office 3,482,232
Patented Dec. 2, 1969

3,482,232
TRANSDUCER POSITIONING MEMBER HAVING HYDROSTATIC BEARING SUPPORTS
William A. Farrand, Fullerton, Robert B. Horsfall, Placentia, Warner D. Williams, Buena Park, and Norman E. Marcum, Laguna Beach, Calif., assignors to North American Rockwell Corporation
Filed Jan. 5, 1967, Ser. No. 607,466
Int. Cl. G11b 5/00
U.S. Cl. 340—174.1                    8 Claims

ABSTRACT OF THE DISCLOSURE

Hydrostatic bearing supported member for positioning transducers at a selectable location with respect to a recording surface, preferably including constraints for restricting rotation of the supported member about its line of motion. A rotation restricting member may be integral with the hydrostatic bearing or may comprise a second member connected to the main member.

BACKGROUND OF THE INVENTION

Field of the invention

The invention relates to a hydrostatic bearing supported member for positioning transducers at selectable positions with respect to a recording surface such as a rotating magnetic disc.

Description of prior art

One prior art example of transducer positioning members including supports, is described in patent application Ser. No. 394,976, now U.S. Patent No. 3,359,549, filed Sept. 8, 1964, by W. A. Farrand et al., describing a disc memory system. The member described in the referenced application is supported by the tension of a belt used in positioning the transducers.

Bearings such as roller bearings, etc. may also be used to support a positioning arm. However, it is desirable that a positioning arm be provided with bearing supports which develop a minimum of friction (particularly static friction) and which can therefore be easily actuated to assume a desired position. In addition, the arm should be constrained to minimize rotation about its own longitudinal axis. Such a rotation may cause undesirable linear displacement of the transducers along the record track and therefore disturb the timing of either recording or reproducing signals.

Regardless of the type of arm configuration selected to meet the requirements of a particular application, it is advantageous to provide means for holding the arm at a selected position with respect to the disc surface, independent of the positioning motor, after the selected position has been attained.

SUMMARY OF THE INVENTION

Briefly, the present invention comprises a hydrostatic bearing supported positioning member having one or a plurality of transducers connected thereto, including means integral with or connected with or connected to the arm for preventing the arm from rotation about its longitudinal axis. Hydrostatic bearings in general have the desirable property of essentially zero static friction and are, therefore, desirable for supporting transducer positioning members. Such a bearing makes use of a fluid supplied under pressure to the bearing to provide separation of the mechanical elements for freedom of motion. The fluid may be either a liquid or gas. In most cases, gas is preferred because it reduces the power required to drive the rapidly moving members of the typical recording device. Therefore, in this description, gas lubrication will be assumed for simplicity of explanation. The selection of the bearing described is not intended to limit the scope of the invention. Furthermore, the description is based on the use of cylindrical surfaces for the bearing members because of the ease of precise fabrication of such cylindrical members. As noted subsequently, however, the cylindrical configuration is also not essential to the spirit of the invention.

One embodiment comprises a cylindrical sleeve supported on a shaft in which the bearing is formed by reducing the radius of portions of the sleeve member or by increasing the radius of portions of the shaft member. The restricted areas between the sleeve and the shaft form the gas bearing and develop the supporting forces for the sleeve. By appropriate separation of the bearing portions, these supporting forces also substantially prevent any rotation of the sleeve about an axis at right angles to the shaft.

In a practical embodiment the arm is driven by a force generator such as a motor which can be quickly energized to drive the arm to a selected position. Thereafter, either the motor must remain active to assure the arm remaining in position, or preferably, the arm may include brake means for holding it at the selected position so that the drive motor may be de-energized.

It is an object of this invention to provide a hydrostatic bearing for supporting a transducer positioning member.

It is a further object of this invention to provide an improved transducer positioning member for a hydrostatic bearing support including means for preventing rotational motion of the member.

It is a further object of this invention to provide an integral restrictor hydrostatic bearing for supporting a transducer positioning member and for supporting a member connected to the transducer supporting member for preventing rotational movement of the positioning member.

These and other objects of this invention will become more apparent in connection with the following drawings.

BRIEF DESCRIPTION OF THE DRAWINGS

FIGURE 3 illustrates a first embodiment of an integral restrictor hydrostatic bearing for supporting a cylindrical sleeve with respect to a shaft wherein the sleeve includes constricted areas for forming the bearing.

FIGURE 4 illustrates a second embodiment of an integral restrictor hydrostatic bearing for supporting a cylindrical sleeve with respect to a shaft wherein the shaft includes raised areas to form the bearing.

FIGURE 8 illustrates a further embodiment of an integral restrictor type bearing in which the region of increased gap in the bearing area is formed by substantially symmetrically disposed longitudinal grooves.

FIGURE 9 illustrates a cross-sectional view of the FIGURE 8 embodiment.

DESCRIPTION OF THE PREFERRED EMBODIMENTS

Figure 1:
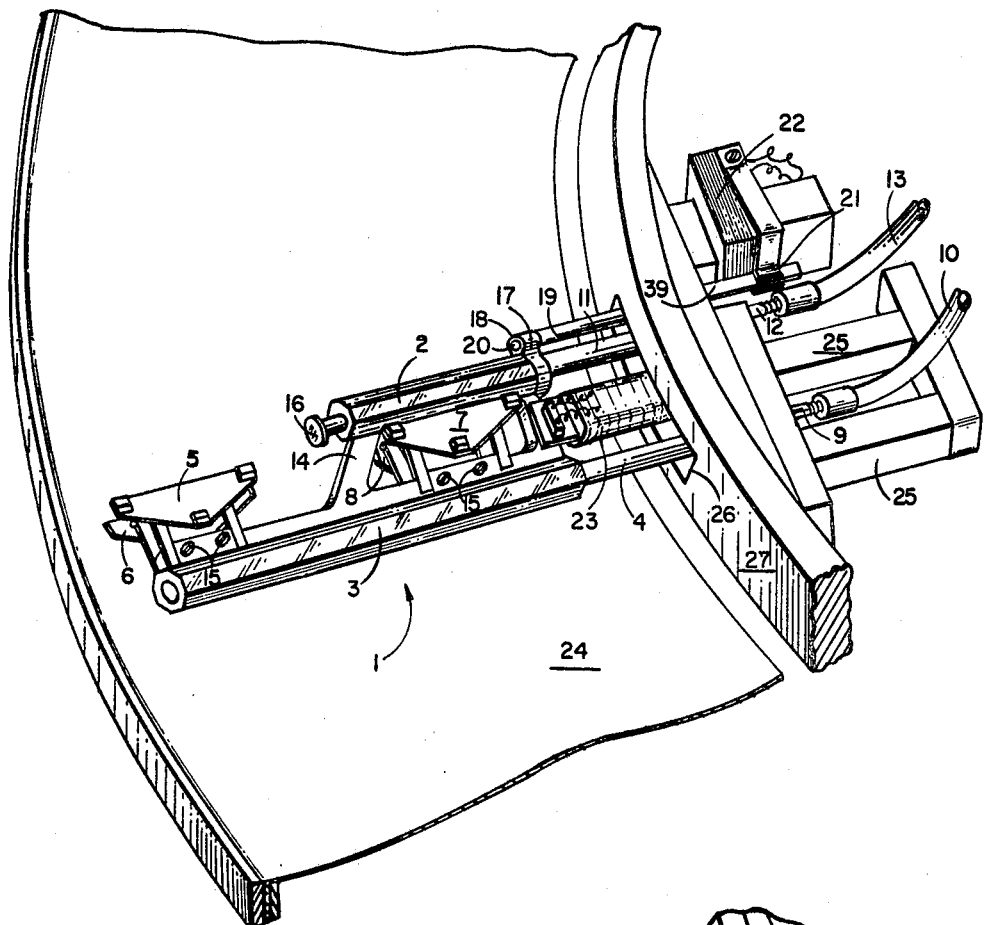
FIGURE 1 illustrates one embodiment of a gas bearing supported positioning member including a second gas bearing supported member connected to the first member for preventing rotational motion.

Referring now to FIGURE 1, wherein is shown a first embodiment of a hydrostatic restrictor gas bearing supported positioning system 1. The system includes sleeve member 3 which encloses fixed shaft 4. The shaft is secured indirectly to housing portion 27. The sleeve is preferably supported on the shaft by an integral restrictor gas bearing as illustrated in subsequent figures. Gas, for example, air, may be supplied to the bearing area by means of an opening provided in the shaft. The shaft is hollow and is connected to a gas source (not shown) such as contaminant-free air supplied by a suitable pump at termination 9. Tube means 10 interconnects the shaft with the gas source. Gas from the source is emitted from the opening and supplies the entrance to the constricted areas formed between the sleeve and the shaft at substantially source pressure. Variations in pressure distribution as the gas passes through the bearing area to the ambient atmosphere provides support reactions as subsequently described.

The system further comprises sleeve member 2 enclosing fixed shaft 11 which is also secured to housing portion 27. A gas bearing is developed between the sleeve and shaft as previously described in connection with member 3. The shaft is connected at termination 12 by tube means 13 to the gas source. In other embodiments the shafts may be interconnected so as to have a single common termination which may be supplied by air to a single tube means. The sleeve members and the interconnecting link means 14 may be formed separately and subsequently interconnected or may be formed as one integral piece of rigid material such as anodized aluminum or sintered beryllium oxide.

The link and sleeve members may be formed by casting, molding or other means well known in the art. The various portions of the system such as sleeves, shafts, etc., may be comprised of various materials and may be produced by various methods well known to those skilled in the art.

Transducer supports 5, 6, 7 and 8 are connected by spring members to sleeve 3. Connecting means 15 such as rivets secure the supports to sleeve member 3. Transducer supports, spring members, etc. are described in a patent application filed on or about Jan. 3, 1967, having the title of "Fluid Bearing Pads for Supporting Transducers," by R. B. Horsfall, et al.

Shaft 11 includes mechanical stop 16 which may comprise a threaded member inserted into a threaded opening in the shaft. Other means may also be used to prevent the sleeve members from being driven off the shafts.

Ring member 17 inserts over sleeve member 2 at one end thereof and is held in place by grooves along its inner surface which mate with ridges of the sleeve member. The ring member includes opening 18. Brake shaft 19 inserts into the opening and is secured therein by means of threaded screw 20 which mates with a threaded opening in the brake shaft. The brake shaft includes relatively flat portions 39 which are gripped by clamp members 21. The clamps may be actuated by de-energizing electro-magnet means 22 or other suitable means. A retaining means could comprise an interference fit between the shaft and sleeve means such that when the bearing is deactuated, the fit between the two surfaces prevents further motion.

Electro-magnetic motor coil 23 is connected to sleeves 2 and 3 for driving the positioning arms radially with respect to recording surface 24 shown herein as an annular tensioned disc as described in the previously referenced patent application for a Disc Memory System. In a practical embodiment, a similar disc is located over the positioning system shown. However, for purposes of this description, it has been omitted from the illustration for greater clarity. The remaining fixed portions 25 of the motor are mechanically connected to fixed housing portion 27 and cooperate with the motor coil 23 through the central opening 26 in said fixed housing portion. The fixed portions include a magnet. The motor shown operates on a principle similar to that of a voice coil loudspeaker system and is the subject of a separate patent application. Current in the coil produces motion of the coil and therefore the sleeves.

Force generators of other types may be applied to the present invention without modifying its scope as will be obvious to those skilled in the art. The particular motor is shown by way of example only and is not intended to be a limitation on the type of device usable herein.

In operation, the transducers are maintained at a desired operating gap with respect to the recording surface by means of the spring tensioned members and a gas bearing developed between the transducer supports and the recording surface by virtue of their relative motion. In the event of irregularities in the recording surface, or for other reasons which might cause sleeve 3 to rotate about shaft 4, the integral restrictor bearing between sleeve 2 and shaft 11 will allow only enough motion so that it develops an opposing force tending to push sleeve 3 back to its original position. Thus any rotation of support member is restricted to an amount less than the mechanical gaps provided in the gas bearings. Therefore, by proper proportioning of the maximum integral restrictor air gap between sleeve 2 and shaft 11 and relation to that between sleeve 3 and shaft 4 and the separation between the two shafts, the maximum amount of rotation permitted by the entire assembly may be held to a value which limits circumferential relative motion of the transducers to an acceptable value.

When it is desired to drive the transducers from one track location on the disc to another track location on the disc, electromagnet 22 is energized to release clamps 21 from brake shaft 39 so that the positioning arm may be directed radially outwardly or inwardly along the diameter of the disc by the motor until the new position is reached. At that time, electromagnet 22 is de-energized to allow clamps 21 to grip shaft 39 and prevent the arm from further movement. Motor coil 23 is then de-energized.

Inasmuch as both sleeves are supported by gas bearings, little or no friction develops between the sleeves which are the moving parts and the shafts which are the fixed parts. As a result, the force the motor must overcome before the arms are moved depends substantially only on the inertia of the moving parts and their desired acceleration rather than on bearing friction.

The transducer supports are spaced along sleeve 3 so that all recording tracks of the disc can be accessed by the transducers connected to supports 5 and 6 or transducers connected to supports 7 and 8.

Figure 2:
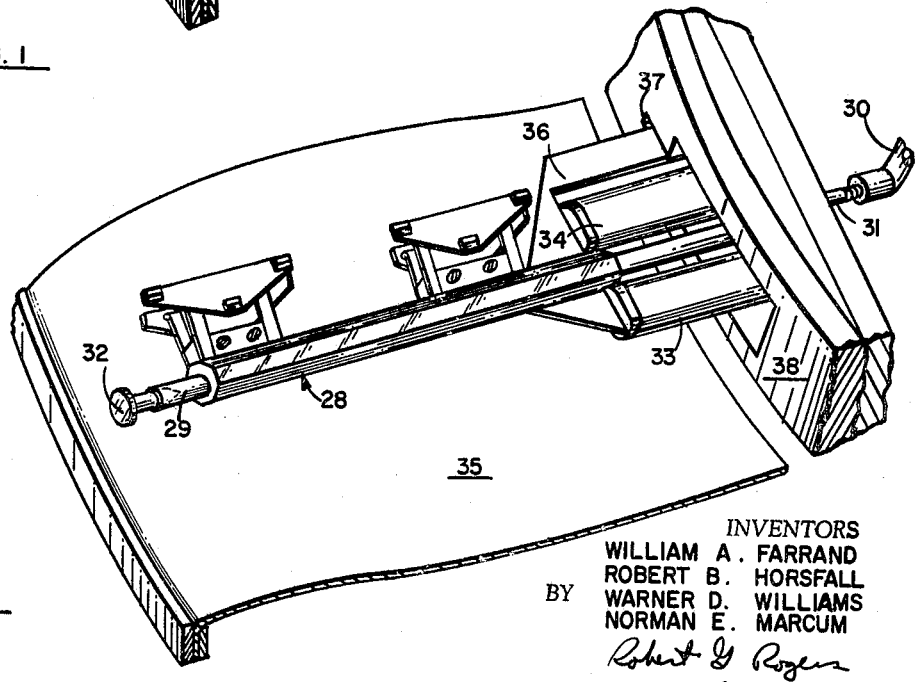
FIGURE 2 illustrates a second embodiment of a gas bearing supported positioning member using a different configuration of the second member connected to the first member for preventing rotational motion.

Referring now to FIGURE 2, wherein is shown a second embodiment of a gas bearing supported positioning system comprising gas bearing supported sleeve 28 enclosing fixed shaft 29. The fixed shaft has an opening connected by a centrally disposed channel to a gas source through tube means 30. Tube means 30 is connected to termination 31 of shaft 29. Mechanical stop 32 comprises a threaded portion which mates with a threaded portion on the end of shaft 29 to prevent the sleeve from excessive outward movement. Transducer supports are connected to the sleeve as previously described in FIGURE 1. Motor means 33 and 34 direct the sleeve radially along the surface of disc 35. Dual motors are used in order to increase the speed with which the arm may be positioned.

Rotational movement is restrained by member 36 comprising a relatively rigid metal blade connected to sleeve 28. Rotational constraints may be provided by the upper and lower surfaces of opening 37 in the housing member 38. In this case, if sleeve 28 attempts to rotate about the longitudinal axis of its shaft, one surface of the blade, depending on the direction of rotation, will contact a surface of opening 37 so that rotation is constrained within the limits of the opening above and below the blade surfaces.

The limits of rotation may be kept below that allowed by consideration of acceptable circumferential transducer motion. Furthermore, clamping means similar to those described in FIGURE 1 may be provided in housing 38 for similar purposes.

Referring now to FIGURE 3, wherein is illustrated a cross-sectional view of a gas bearing support sleeve 40 and hollow shaft 41. The hollow in the shaft is connected to a gas source as previously described and is interconnected with chamber 44 and opening 43. Chamber 44, therefore, supplies air at substantially source pressure to integral restrictor bearing elements 45 and 46. The bearing elements comprise relatively long constricted areas 47 and 47' and relatively short constricted areas 48 and 48'. The support forces are developed in the constricted areas between the surface of the sleeve 40 and the surface of shaft 41. Air is exhausted to ambient pressure past the relatively short constricted areas.

Referring now to FIGURE 4, wherein is illustrated a cross-section of a second gas bearing embodiment comprising sleeve 49 and hollow shaft 51. The hollow shaft is again connected to a gas source and includes openings 52 and 52' connecting source pressure in channel 53 to chamber 54. Chamber 54 supplies gas at substantially source pressure to integral restrictor gas bearings 55 and 55'. These gas bearings comprise relatively long constricted areas 56 and 56' and relatively short constricted areas 57 and 57'. The supporting forces are again developed in the constricted areas between shaft 51 and sleeve 49. As in the FIGURE 3 embodiment, air is exhausted to ambient pressure past the short constricted areas.

In either case, as shown in FIGURE 3 and FIGURE 4, the radial clearance between shaft and sleeve in the short constricted portion may be approximately 0.001 inches. The corresponding gap in the relatively long constricted portion may be approximately twice as large in a preferred embodiment. In other embodiments, both the ratio of 2:1 and the absolute value of the minimum gap may be changed. However, the final constriction reached by the gas in its passage from source pressure to ambient pressure must have a smaller gap than the earlier portion of the bearing. These spaces may be changed as required to suit the integral restrictor bearing for a particular application.

In the embodiment shown, the relatively long portion is approximately nine times as long as the relatively short portion. This ratio may be modified as required for a particular application but in general, for maximum efficiency, the length ratio should remain relatively large. Furthermore, for a particular application there is an optimum ratio between the overall length of the bearing portion and the bearing diameter in the constricted area. If this ratio is too small, the supporting forces for a given supply pressure are reduced over the optimum condition because of reduction in the projected area over which the pressure can act. Conversely, if the ratio is too large, the gas may spiral around the bearing when it is loaded in such a way that the supporting force is again reduced relative to the optimum configuration. In practice, the length to diameter ratio in the neighborhood of one is optimum.

In a practical embodiment, the gas supply pressure between 2 and 60 p.s.i. may be required to provide adequate sleeve support. In addition to the detailed bearing configuration, the load which may be supported without mechanical contact between the relatively moving parts determines the necessary supply pressure.

Figure 5:
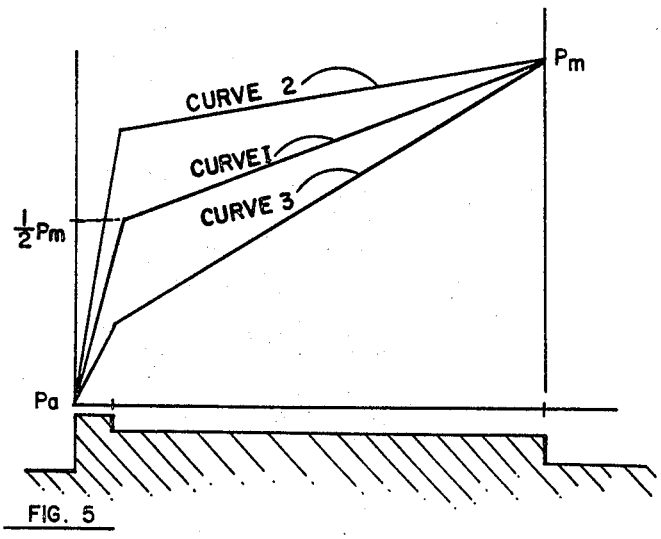
FIGURE 5 illustrates pressure distribution curves for the fluid in the constricted areas of an integral restrictor hydrostatic bearing.

Idealized pressure curves for an integral restrictor bearing are shown in FIGURE 5. The maximum pressure $P_m$ occurs at the beginning of the long portions of the bearings and the pressure gradually drops at an approximate linear rate to the junction of the long and short portions of the bearing. From this point it drops at an increasing rate, again approximately linearly to ambient pressure at the exhaust.

Curve 1 represents a preferred distribution of pressure within the bearing when it is centered. As indicated, approximately one-half the entire pressure drop occurs over the long portion of the bearing, and the other half over the short portion of the bearing. Curve 2 represents the distribution of pressure on the side of the displaced bearing where the gap has been reduced, while curve 3 represents the corresponding situation on the opposite side where the gap has been increased. In curve 2 the breaking point occurs at a higher pressure and in curve 3 at a lower pressure than it does at curve 1. The integrated pressure over the side of the bearing having reduced gap is therefore greater than the integrated pressure over the side having increased gap, and the result is a restoring force tending to re-center the bearing.

Figure 6:
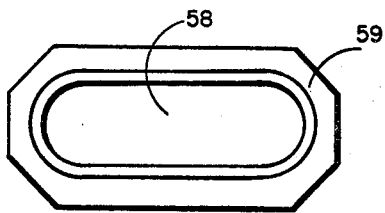
FIGURE 6 illustrates a cross-sectional view of a shaft and sleeve configuration in which rotational constraint results from the shape of the bearing members.
Figure 7:
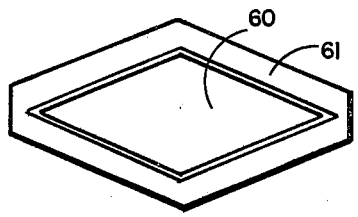
FIGURE 7 illustrates a cross-sectional view of a second embodiment of a shaft and sleeve configuration in which rotational constraint results from the shape of the bearing members.

Referring now to FIGURE 6 and 7, in which two alternative sleeve configurations are shown in cross-section. In the FIGURE 6 embodiment, shaft 58 is oval in cross-section and the sleeve 59 has a matching oval opening through it. In the FIGURE 7 embodiment, shaft 60 has a rhombic or diamond-shaped cross-section and sleeve 61 a mating diamond-shaped opening. In both cases, the longitudinal cross-section of the gap may be configured as in either FIGURE 3 or FIGURE 4 while being maintained uniform around the circumference. Non-circular cross-sections, as exemplified by the illustrations, may be used as an alternate to the two-member arrangement previously described to prevent relative rotation of sleeve and shaft. The non-circular cross sections are more difficult to produce with adequate precision in the present state of the art.

Referring now to FIGURE 8, wherein is shown a perspective view in partial elevation and of one configuration of an integral restrictor bearing comprising longitudinal grooves 62 in place of a circumferentially uniform gap. Although FIGURE 8 shows an embodiment in which the bearing detail is formed on the shaft, it should be understood that an equivalent configuration may be formed on the interior of the sleeve for operation with a smooth shaft. The advantage of the configuration is the relative restriction of circumferential fluid flow which permits use of a longer distance between the supply end and the final narrow gap before exhaust to the ambient pressure. This technique may be used to increase the load capacity of a bearing for which other parameters are fixed. It is, however, not quite as simple to fabricate with adequate precision as the completely cylindrical configurations previously described.

FIGURE 9 shows a cross sectional view of the FIGURE 8 embodiment, showing grooves 62 and raised areas 63 on either side of the grooves.

Although the invention has been described and illustrated in detail, it is to be understood that the same is by way of illustration and example only, and is not to be taken by way of limitation; the spirit and scope of this invention being limited only by the terms of the appended claims.

We claim:
1. A hydrostatic bearing suported member for positioning transducers with respect to a recording surface, said transducers and said recording surface being separated by an air gap, said hydrostatic bearing member comprising,
   a shaft,
   sleeve means completely enclosing said shaft and having transducers connected thereto, either one of said shaft or sleeve means including portions which, with the adjacent surface of the other means, forms at least two separated hydrostatic bearing portions for supporting said sleeve on said shaft, each of said hydrostatic bearing portions comprising integral restrictor bearings having at least a girst region of relatively restricted gap which fluid enters at substantially supply pressure and a second region of more restricted gap through which the fluid exhausts to ambient pressure, said shaft including means for admitting fluid to the hydrostatic bearing portions, means for substantially preventing rotation of said sleeve means about the longitudinal axis of said shaft.

2. The combination as recited in claim 1, wherein said integral restrictor bearing portions comprise a first relatively long region of substantially uniform nominal gap and a relatively short second region of more restricted gap at the exhaust end, said sleeve and shaft are circular in cross-section and wherein a second hydrostatic bearing sleeve and shaft are connected to the first sleeve and shaft for preventing rotation of said first sleeve about the longitudinal axis of said first shaft.

3. The combination as recited in claim 1, wherein said bearing portions comprise first relatively long areas adjacent to the gas supply and second relatively short regions adjacent thereto between the first area and the ambient pressure area wherein the ratio between the nominal gap in the first area and the nominal gap in the second area is in a range of one and one-half to four.

4. The combination as recited in claim 1, wherein the length of said first area is from six to twelve times as long as the second area.

5. The combination as recited in claim 1, wherein the gap in said first area is within the range of one and one-half to four times as great as the gap in the second area, said first area being within the range of six to twelve times as long as said second area.

6. The combination as recited in claim 1, wherein said first area has a length approximately equal to the diameter of said shaft.

7. The combination as recited in claim 1, wherein said bearing areas are formed by means of shaft means of uniform diameter and said sleeve means comprising regions of different diameter such that the gas supply and exhaust regions are substantially larger in diameter than the shaft, and wherein said first relatively long region is formed by a reduced diameter in said sleeve means and said second area is formed by a still further reduction in sleeve diameter such that the difference in diameters in said second region provides a diametral clearance small enough to provide desirable flow restrictions, and wherein the corresponding difference in diameter in said first region is in the range of one and one-half to four times said amount and the length of said first region is in the range of six to twelve times the length of said second region.

8. The combination as recited in claim 1, wherein said bearing portions are formed between a sleeve of uniform diameter and a shaft comprising areas of different diameter such that the diameters in the gas supply and exhaust regions are materially smaller than the sleeve diameter and the diametral difference between sleeve and shaft in said second region provides a diametral clearance small enough to provide flow restrictions, and wherein the corresponding difference in diameter in said first region is in the range of one and one-half to four times said amount and the length of said first region is in the range of six to twelve times the length of said second region.

References Cited

UNITED STATES PATENTS

| | | | |
|---|---|---|---|
| 2,054,055 | 9/1936 | Klahn | 308—9 |
| 3,034,111 | 5/1962 | Hoagland | 340—174.1 |
| 3,130,331 | 4/1964 | Jallen | 340—174.1 |
| 3,166,361 | 1/1965 | Panzer | 308—5 |
| 3,314,057 | 4/1967 | Mogtader | 340—174.1 |
| 3,381,285 | 4/1968 | Wallen | 340—174.1 |
| 3,390,886 | 7/1968 | Rabinow | 274—23 |

BERNARD KONICK, Primary Examiner

ROBERT S. TUPPER, Assistant Examiner

U.S. Cl. X.R.

179—100.2; 274—23; 308—5